United States Patent
Bhogal et al.

(10) Patent No.: US 7,000,221 B2
(45) Date of Patent: Feb. 14, 2006

(54) SCRIPT EVALUATOR

(75) Inventors: Kulvir Singh Bhogal, Fort Worth, TX (US); Hung The Dinh, Round Rock, TX (US); Teng S. Hu, Austin, TX (US); Mandeep Singh Sidhu, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 10/210,820

(22) Filed: Jul. 31, 2002

(65) Prior Publication Data

US 2004/0025143 A1   Feb. 5, 2004

(51) Int. Cl.
  *G06F 9/44* (2006.01)
(52) U.S. Cl. ............. 717/115; 717/106; 717/108; 717/116
(58) Field of Classification Search ........ 717/114–115, 717/118, 154, 158, 112, 136, 116, 106, 107, 717/108; 709/223–224, 239; 714/25, 47; 715/809; 707/6; 706/17
  See application file for complete search history.

(56) References Cited

U.S. PATENT DOCUMENTS

| | | | | |
|---|---|---|---|---|
| 5,933,144 | A * | 8/1999 | Alcorn .................... | 715/809 |
| 5,974,572 | A * | 10/1999 | Weinberg et al. ........... | 714/47 |
| 6,496,866 | B1 * | 12/2002 | Attanasio et al. .......... | 709/239 |
| 6,530,075 | B1 * | 3/2003 | Beadle et al. ............. | 717/114 |
| 6,549,944 | B1 * | 4/2003 | Weinberg et al. .......... | 709/224 |
| 6,634,022 | B1 * | 10/2003 | Leermakers .............. | 717/158 |
| 6,651,241 | B1 * | 11/2003 | Hernandez, III ........... | 717/112 |
| 6,681,386 | B1 * | 1/2004 | Amin et al. .............. | 717/136 |
| 6,691,301 | B1 * | 2/2004 | Bowen .................. | 717/114 |
| 6,701,514 | B1 * | 3/2004 | Haswell et al. ........... | 717/115 |
| 6,779,172 | B1 * | 8/2004 | Weerawarana et al. ...... | 717/115 |
| 6,826,606 | B1 * | 11/2004 | Freeman et al. .......... | 709/223 |
| 6,865,691 | B1 * | 3/2005 | Brundridge et al. ........ | 714/25 |

OTHER PUBLICATIONS

TITLE: Scripting Highly Autonomous Simulation Behavior Using Case-Based Reasoning, author: Catsimpoolas et al, IEEE, 1992.*
TITLE: A compact architecture for dialogue management based on scripts and meta-outputs, author: Rayner et al., ACM, Apr., 2000.*

* cited by examiner

*Primary Examiner*—Chameli C. Das
(74) *Attorney, Agent, or Firm*—Duke W. Yee; Marilyn Smith Dawkins; Stephen R. Tkacs

(57) ABSTRACT

A script evaluator analyzes script code and identifies possible problems with respect to given browsers and given browser versions. When configuring the parameters of analysis of the script evaluator, the user may select versions of known browsers for which support is desired. The script evaluator may point out functions in the script code that are not supported by certain versions of selected browsers. The evaluator may also suggest alternative functions that may be supported by all desired browser versions. Help information may be provided to assist the user. The script evaluator may receive browser support and help information from a library. The library may be collected from the browser software vendors or may be supplied with the script evaluator. The script evaluator may also include an editor or may be part of an existing developer tool.

23 Claims, 5 Drawing Sheets

| BROWSER: BROWSER 1 | | | |
|---|---|---|---|
| VERSION: 1.0 | | | |
| FUNCTION | SUPPORTED (Y/N) | LINK TO ALTERNATE | LINK TO HELP FILE |
| FUNCTION 1 | N | | |
| FUNCTION 2 | Y | | |
| FUNCTION 3 | Y | | HELP 1 |
| FUNCTION 4 | Y | | |
| FUNCTION 5 | N | FUNCTION 2 | HELP 2 |
| FUNCTION 6 | N | FUNCTION 3 | HELP 3 |
| FUNCTION 7 | Y | | |
| FUNCTION 8 | Y | | |

SCRIPT EVALUATOR

BACKGROUND OF THE INVENTION

1. Technical Field

The present invention relates to data processing and, in particular, to scripts in a network data processing system. Still more particularly, the present invention provides a method, apparatus, and program for evaluating scripts.

2. Description of Related Art

The worldwide network of computers commonly known as the "Internet" has seen explosive growth in the last several years. Mainly, this growth has been fueled by the introduction and widespread use of so-called "web browsers," which enable simple graphical user interface-based access to network servers, which support documents formatted as so-called "web pages." These web pages are versatile and customized by authors. For example, web pages may mix text and graphic images. A web page also may include fonts of varying sizes.

A browser is a program that is executed on a graphical user interface (GUI). The browser allows a user to seamlessly load documents from the Internet and display them by means of the GUI. These documents are commonly formatted using markup language protocols, such as hypertext markup language (HTML). Portions of text and images within a document are delimited by indicators, which affect the format for display. In HTML documents, the indicators are referred to as tags. Tags may include links, also referred to as "hyperlinks," to other pages. The browser gives some means of viewing the contents of web pages (or nodes) and of navigating from one web page to another in response to selection of the links.

Browsers may also read and interpret pages including scripts, such as JAVAScript or JScript. JAVAScript is a popular scripting language that is widely supported in Web browsers and other Web tools. JAVAScript adds interactive functions to HTML pages, which are otherwise static, since HTML is a display language, not a programming language. JScript is similar to JAVAScript, but has extensions specifically for the Microsoft Windows environment.

Different Web browser software applications support scripts to different degrees. In fact, different versions of a browser application may support scripts differently. The rivalry between browsers in the market, such as Netscape Navigator by Netscape Communications and Internet Explorer by Microsoft Corporation, has led to a disparity between standards. Netscape uses different syntax with JAVAScript than Internet Explorer uses with JScript.

Browser and platform dependent script functions can cause a nightmare for script development, testing, and maintenance. Therefore, it would be advantageous to provide an improved script evaluator for determining browser support.

SUMMARY OF THE INVENTION

The present invention provides a script evaluator that analyzes script code and identifies possible problems with respect to given browsers and given browser versions. When configuring the parameters of analysis of the script evaluator, the user may select versions of known browsers for which support is desired. The script evaluator may point out functions in the script code that are not supported by certain versions of selected browsers. The evaluator may also suggest alternative functions that may be supported by all desired browser versions. Help information may be provided to assist the user. The script evaluator may receive browser support and help information from a library. The library may be collected from the browser software vendors or may be supplied with the script evaluator. The script evaluator may also include an editor or may be part of an existing developer tool.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
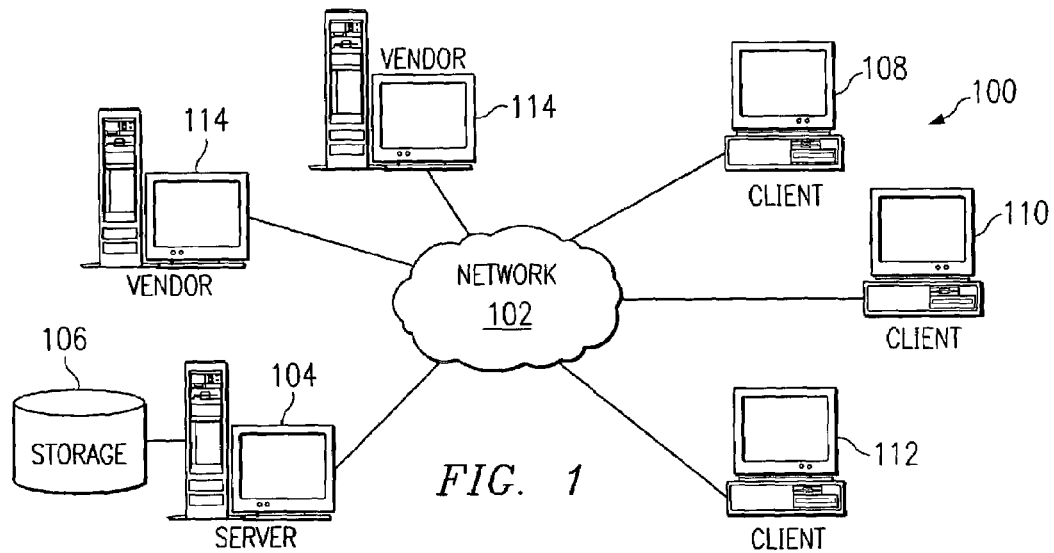
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 and provides access to storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

Clients 108, 110, 112 may be used by Web developers to create Web content including scripts. A Web developer may wish to create a script that is supported by a predetermined subset of known browsers and given versions of those browsers. However, due to the nature of Web browsers on the market, script support in competing browsers is inconsistent. Furthermore, as new versions of Web browsers are released, new script functions are often added to expand functionality. Web content may also be extended to other applications, such as for example e-mail and user network (usenet) clients. Thus, writing a script that is supported by a wide range of applications and application versions is not an easy task.

In accordance with a preferred embodiment of the present invention, a script evaluator is provided for Web content developers. The script evaluator uses a library of functions supported by known applications and application versions to evaluate a script to determine whether the script is supported by a desired subset of applications and application versions. This information may be compiled in a data structure, such as a table, for each version of each application. Each data structure may include information for every known function, whether the version of the application supports the function, alternate functions, and other information. The library may take other forms within the scope of the present invention. For example, a data structure may be provided for each function rather than each version of each application. The data structures may also be arranged in a larger data structure, such as a relational database.

A code evaluation reference library may be included with the script evaluator. Alternatively, the library may be stored in a storage unit accessible via network 102, such as storage unit 106. The script evaluator uses the appropriate tables for the desired applications and application versions and performs a function-by-function comparison between the script and the supported functions. Using the tables, the script evaluator may suggest alternate functions and/or provide other information to assist the developer.

As an example, a content developer may desire that the script be compliant with Netscape 3.0 or later and Internet Explorer 3.0 or later. The developer may then select the desired applications and versions, via a graphical user interface (GUI), and the script evaluator will retrieve the appropriate library tables. As a result, the script evaluator will point out functions in the script that are not supported by these browsers. The script evaluator may also perform an analysis of the code and suggest alternative functions for unsupported functions. When a function is not supported in one browser, the script evaluator may provide information about a function that will work with the problematic browser or version and can be tolerated via conditional statements.

In a preferred embodiment of the present invention, individual data structures for the software applications are provided by the actual vendors of the software via vendor servers 114. Thus, the vendors themselves may be actively involved in informing developers about which functions are supported and, if a function is not supported, how to use alternative supported functions to achieve the desired functionality. The vendors may receive a master list of functions from a script evaluator site, which may be, for example, server 104 and storage unit 106. Using this master list, vendors may create the library data structures. Vendors may also add functions to the master list if a new version of the software adds functionality.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
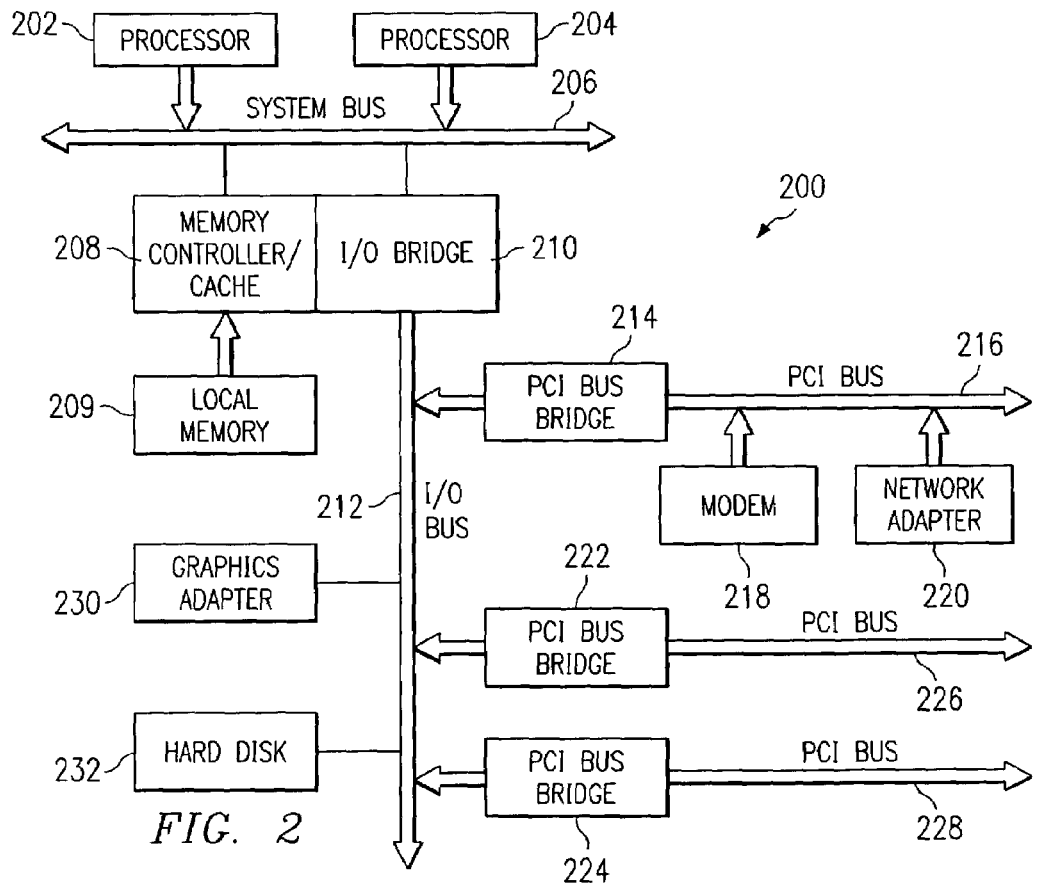
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figures 3, 5:
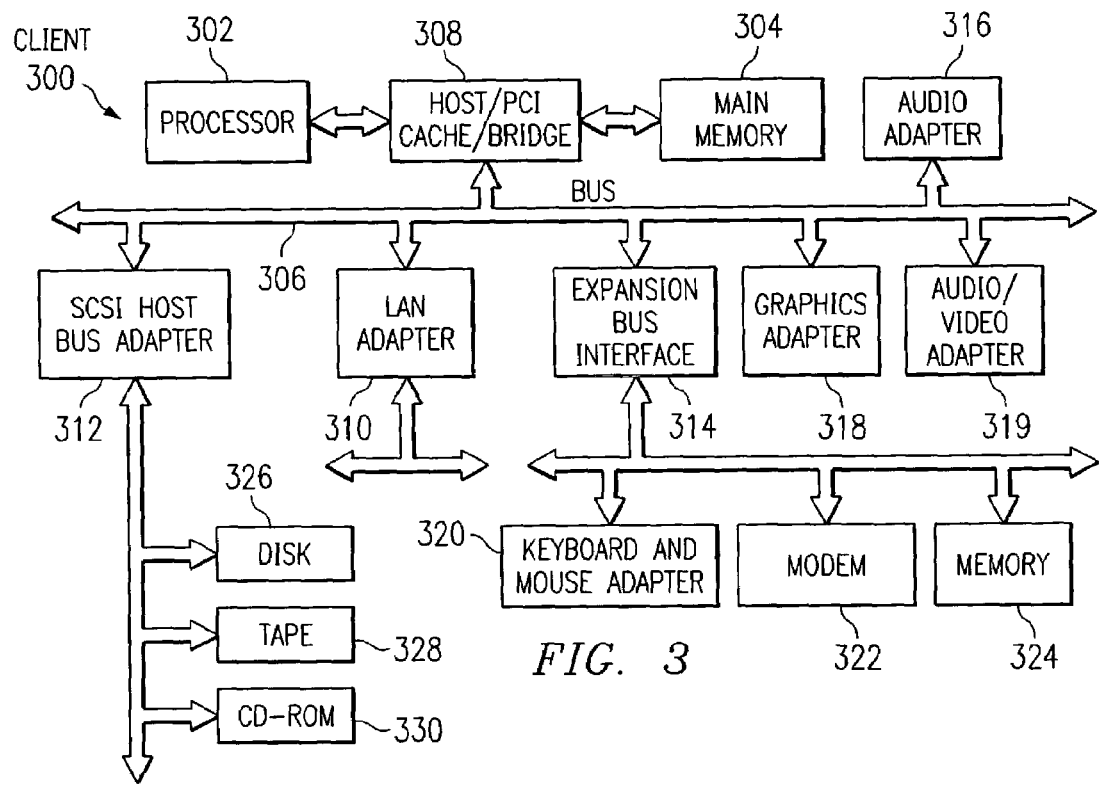
FIG. 3 is a block diagram illustrating a data processing system in which the present invention may be implemented.
FIG. 5 illustrates an example library table in accordance with a preferred embodiment of the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
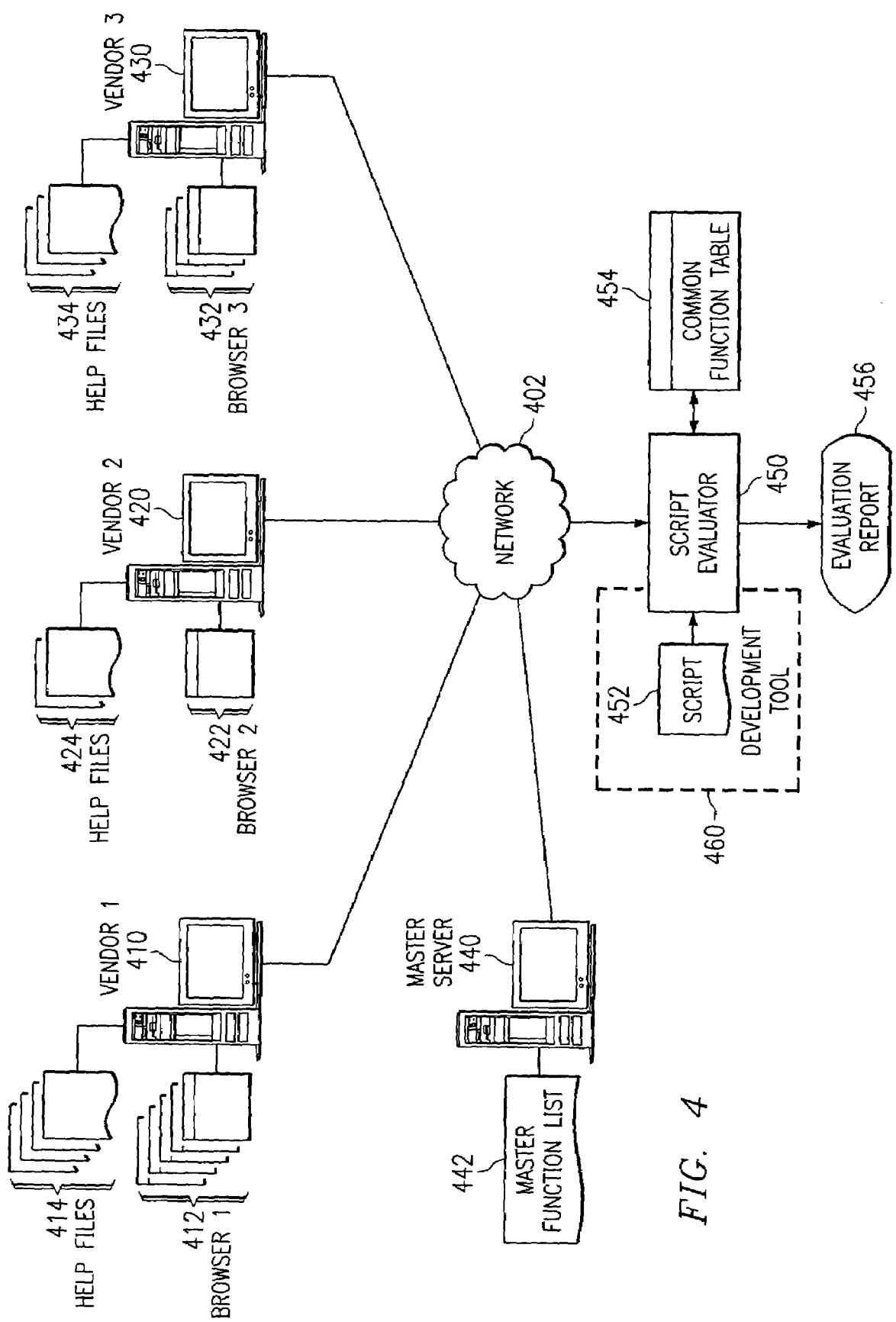
FIG. 4 is a block diagram illustrating an example script evaluator system in accordance with a preferred embodiment of the present invention.

With reference now to FIG. 4, a block diagram illustrating an example script evaluator system is shown in accordance with a preferred embodiment of the present invention. Network 402 connects vendor 1 server 410, vendor 2 server 420, vendor 3 server 430, and script evaluator 450. Vendor 1 server 410 provides access to library tables 412 for application 1 and help files 414. Similarly, vendor 2 server 420 provides access to library tables 422 for application 2 and help files 424. And, vendor 3 server 430 provides access to library tables 432 for application 3 and help files 434.

The library tables provide information about which functions are supported and how to use supported functions to achieve the same functionality. The library tables may include a table for each version of each application. The vendors may receive master function list 442 from master server 440. Using this master function list, vendors may create the library data structures. Vendors may also add functions to the master list if a new version of the software adds functionality.

Script evaluator 450 may be used by a Web content developer to evaluate a script, such as script 452, which is selected using a graphical user interface (GUI). For example, a user may use an "Open" command in a "File" menu in the GUI to select a script file for evaluation. The user may then select applications, such as Web browsers, and application versions for which support is desired. The script evaluator then retrieves the library tables for the selected applications and application versions. The script evaluator may then compare the retrieved tables and build common function table 454, which contains only those functions commonly supported by the selected applications and application versions.

The script evaluator then performs a function-by-function comparison between script 452 and the retrieved library tables. If a function is not supported by one or more application versions, the script evaluator determines if there is an alternate function that is common to all the desired application versions. The script evaluator may also retrieve help files to provide further information to assist the user. In a preferred embodiment, the library tables reference the help files for functions that are unsupported and functions for which further information may help the developer.

The script evaluator then generates evaluation report 456. The evaluation report may be presented in hard copy form or may be displayed to the user via a GUI. For example, the evaluation report may reproduce the script in the GUI and highlight unsupported functions. The user may then select the highlighted functions to receive more information. Unsupported functions may be highlighted in many different ways, such as underlining the unsupported code, displaying an unsupported function in association with a graphical icon, displaying the unsupported functions in a different color. Other highlighting methods will also be apparent to a person of ordinary skill in the art.

The developer may then edit the script and evaluate the edited script to determine whether the edited script is supported by the desired application versions. This process may be repeated until a sufficiently supported script is achieved. Alternatively, the user may edit the unsupported function within the GUI. The script evaluator may then automatically reevaluate the edited line of code and refresh the display. Thus, the user may quickly, conveniently, and interactively edit a script until a desired level of support is realized.

Script evaluator 450 may include an editing function to allow the user to create script 452. As such, the script evaluator may be incorporated into development tool 460. Alternatively, the script evaluator may operate in conjunction with an existing development tool 460, such as Dreamweaver by Macromedia, Inc. or FrontPage by Microsoft Corporation. For example, the script evaluator may be provided as a plug-in application for the development tool.

FIG. 5 illustrates an example library table in accordance with a preferred embodiment of the present invention. In the depicted example, a table for "application 1," version "1.0" is shown. The table provides information for functions 1–8, which in this example are all of the known functions for all scripts and applications. As shown in FIG. 5, browser 1, version 1.0 supports function 2, function 3, function 4, function 7, and function 8. The library table provides alternate functions for unsupported functions 5 and 6. The table also provides a reference to help files for function 3, function 5, and function 6. The reference to a help file may be a file name, a uniform resource locator (URL), or other known file reference. In a preferred embodiment of the present invention, the help file reference is a URL.

Figure 6:
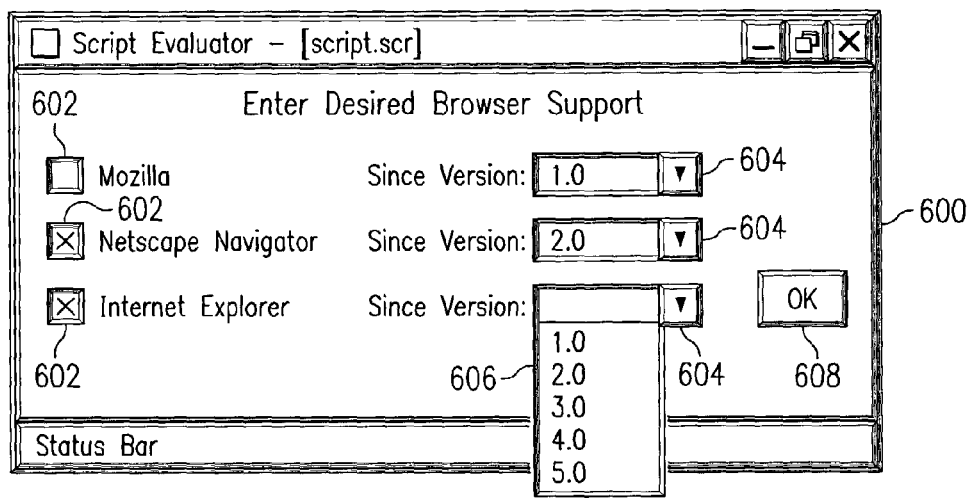
FIG. 6 depicts an example application selection screen in accordance with a preferred embodiment of the present invention.

With reference now to FIG. 6, an example application selection screen is depicted in accordance with a preferred embodiment of the present invention. Application selection window 600 includes check boxes 602 for all known Web applications. In the example shown in FIG. 6, the known Web applications are Web browsers Mozilla by The Mozilla Organization, Netscape Navigator, and Internet Explorer. In the depicted example, the user has selected Netscape Navigator and Internet Explorer.

Application selection window 600 also includes version fields 604. Using version fields 604, a user may indicate an earliest version of the application for which support is desired. Each version field may include a drop-down box, such as drop-down box 606, for selection of known versions. When the desired applications and application versions are selected, the user may select "OK" button 608.

Figure 7:
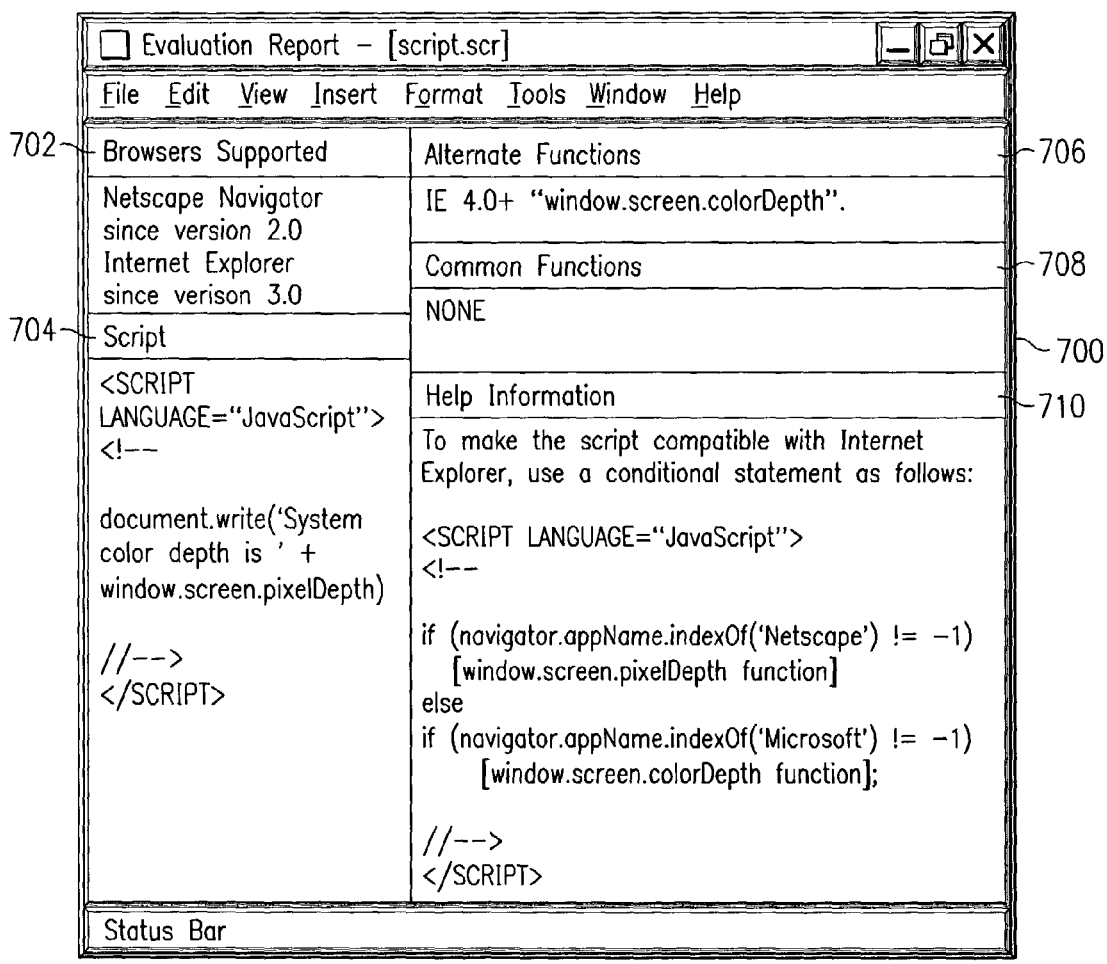
FIG. 7 depicts an example evaluation report screen in accordance with a preferred embodiment of the present invention.

Turning now to FIG. 7, an example evaluation report screen is shown in accordance with a preferred embodiment of the present invention. Evaluation report screen 700 includes "Browsers Supported" portion 702, "Script" portion 704, "Alternate Functions" portion 706, "Common Functions" portion 708, and "Help Information" portion 710. "Browsers Supported" portion 702 indicates the applications and application versions that were selected by the user. In the depicted example, the user has selected Netscape Navigator version 2.0 or later and Internet Explorer version 3.0 or later. "Script" portion 704 displays the script that is being evaluated. Unsupported functions in the script may be highlighted, such as by displaying the functions in association with graphical icons. The user may then select an unsupported function in "Script" portion 704 and the remaining portions will be automatically populated, as needed. "Alternate Functions" portion 706 displays alternate functions that are indicated in the library tables for a selected unsupported function. These alternate functions may be listed by application. "Common Functions" portion 708 displays alternate functions that are common to and supported by all selected applications and application versions. The user may then replace the unsupported function in the script with a common function. There may be times, however, when a developer may choose to use another function, such as by using conditional statements. "Help Information" portion 710 may include this information and other hints and tips for using script functions to achieve the most desired functionality and support.

The graphical user interface may also allow the user to edit a line of code in "Script" portion 704. In response to editing a line of code, the script evaluator may automatically evaluate that line of code and refresh evaluation report window 700. Thus, the developer may use the information in "Alternate Functions" portion 706, "Common Functions" portion 708, and "Help Information" portion 710 to interactively edit the script to realize a desired level of support.

Help information may include other unsolicited suggestions. For example, if a script includes functions that are only supported by later versions of a browser, the following help information may be given:

The "window.screen.pixelDepth" function is only supported by NS version 4.0 or later. Recommended Solution: Include the following condition: "if (navigator.appVersion.substr(0, 1)>3)".

Given the alternate functions, common functions, and help information, the developer may edit the script to ensure proper browser support.

Figure 8:
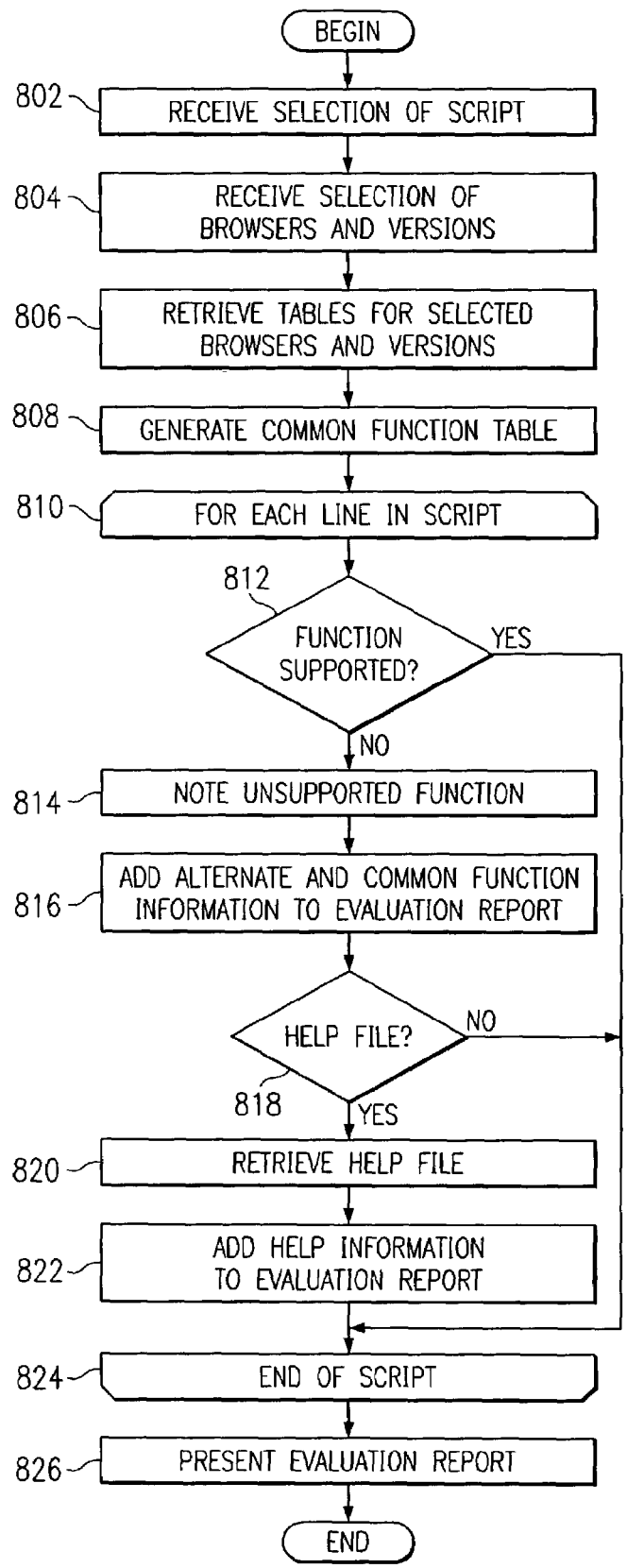
FIG. 8 is a flowchart illustrating the operation of a script evaluator in accordance with a preferred embodiment of the present invention

With reference to FIG. 8, a flowchart illustrating the operation of a script evaluator is shown in accordance with a preferred embodiment of the present invention. The process begins and receives the user selection of a script file (step 802) and receives the selection of desired browsers and versions (step 804). The script file may be selected in a graphical user interface, such as by the selection of an "Open" command in a menu. The GUI may present a series of check boxes, radio buttons, and/or drop-down boxes to select browsers and browser versions. For example, the GUI may present every known browser and, for each browser selected, present a drop-down box listing every known version for that browser.

The process then retrieves the library tables for the selected browsers and versions (step 806) and generates a common function table (step 808). Each library table for the selected browsers and versions preferably includes a row for each known function and an indication of whether each function is supported by the version of the browser. The common function table is preferably derived from the library tables by determining which functions are supported by every selected browser version.

A loop begins, wherein the loop executes for each line or function in the script (step 810). A determination is made as to whether the function in the current line of code is supported (step 812). This determination may be made by checking the function against the common function table. If the function is supported by every selected browser version, then the function will appear in the common function table. If the function is supported, the loop repeats.

If the function is not supported in step 812, the process notes the unsupported function (step 814) and adds alternate and common function information to the evaluation report (step 816). In a preferred embodiment of the present invention, when a function is not supported for a browser version, the process checks the corresponding table to identify alternate functions. If an alternate function exists that is also in the common function table, then that alternate function will be the preferable alternate function. Other alternate functions may also be presented to assist the developer.

The process may also present version support information for the function. For example, the process may present an indication of which browser versions do support the function. Therefore, a developer may determine that a particular browser version is the main or sole offender. The developer may then use the version support information to reconsider the desired browser and browser version support.

Next, a determination is made as to whether a help file is referenced for the unsupported function (step 818). If a help file is not referenced, the loop repeats; otherwise, the process retrieves the help file (step 820) and adds the help information to the evaluation report (step 822). Thereafter, the loop ends (step 824). The process presents the evaluation report (step 826). Then, the process ends.

Thus, the present invention solves the disadvantages of the prior art by providing a script evaluator that analyzes script code and identifies possible problems with respect to given browsers and given browser versions. The script evaluator may point out functions in the script code that are not supported by certain versions of selected browsers. The evaluator may also suggest alternative functions that may be supported by all desired browser versions. Help information may be provided to assist the user. The script evaluator may receive browser support and help information from a library. The library may be collected from the browser software vendors or may be supplied with the script evaluator. The script evaluator may also include an editor or may be part of an existing developer tool.

The present invention may also apply to coded files or documents other than scripts. For example, the present invention may be used to evaluate support for word processing documents, Musical Instrument Digital Interface (MIDI) files, HyperText Markup Language (HTML) pages, spreadsheet documents, or other files or documents for which support may vary among different applications and application versions.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for evaluating a script, comprising:
    receiving a library of supported functions for a plurality of applications, wherein the library of supported functions comprises a plurality of function data structures including a function data structure for each of the plurality of applications;
    comparing script functions in the script to the library of supported functions;
    identifying at least one unsupported script function, wherein the at least one unsupported script function is not supported by at least one application in the plurality of applications;
    generating a common function data structure based on the plurality of function data structures; and
    identifying at least one common function for the at least one unsupported script function based on the common function data structure.

2. The computer implemented method of claim 1, wherein each of the plurality of applications supports a common script language.

3. The method of claim 1, wherein the script comprises source code embedded in a hypertext markup language document.

4. The computer implemented method of claim 1, wherein the plurality of function data structures includes a function data structure for each of a plurality of versions of an application.

5. The computer implemented method of claim 1, wherein the plurality of function data structures are received from application vendors.

6. The computer implemented method of claim 1, wherein each function data structure is derived from a master function list.

7. The computer implemented method of claim 1, wherein each function data structure identifies at least one of supported functions, alternate functions, and help information.

8. The computer implemented method of claim 1, further comprising:
    identifying at least one alternate function for the at least one unsupported script function based on the library of supported functions.

9. The computer implemented method of claim 1, further comprising:
    generating on evaluation report.

10. The computer implemented method of claim 9, wherein the evaluation report identifies at least one alternate function for the at least one unsupported script function.

11. The computer implemented method of claim 9, wherein the evaluation report identifies at least one common function for the at least one unsupported script function.

12. The computer implemented method of claim 9, wherein the evaluation report identifies help information for the at least one unsupported script function.

13. The computer implemented method of claim 1, wherein the plurality of applications includes a plurality of versions of at least a first application.

14. The computer implemented method of claim 1, wherein the plurality of applications includes a plurality of Web browsers.

15. A computer implemented method for evaluating a coded file, comprising:
    receiving a library of supported codes for a plurality of applications, wherein the library of supported codes comprises a plurality of code data structures including a code data structure for each of the plurality of applications;
    comparing codes in the coded file to the library of supported codes; and
    identifying at least one unsupported code, wherein the at least one unsupported code is not supported by at least one application in the plurality of applications;
    generating a common code data structure based on the plurality of code data structures; and
    identifying at least one common code for the at least one unsupported code based on the common code data structure.

16. A computer system for evaluating a script, comprising:
    a library of supported functions for a plurality of applications, wherein the library of supported functions comprises a plurality of function data structures including a function data structure for each of the plurality of applications; and
    a script evaluator, wherein the script evaluator compares script functions in the script to the library of supported functions and identifies at least one unsupported script function, wherein the at least one unsupported script function is not supported by at least one application in the plurality of applications;
    wherein the script evaluator generating a common function data structure based on the plurality of function data structures and identifies at least one common function for the at least one unsupported script function based on the common function data structure.

17. The computer system of claim 16, wherein each function data structure is derived from a master function list.

18. The computer system of claim 16, wherein each function data structure identifies at least one of supported functions, alternate functions, and help information.

19. The computer system of claim 16, wherein the script evaluator identifies at least one alternate function for the at least one unsupported script function based on the library of supported functions.

20. The computer system of claim 16, wherein the script evaluator generates an evaluation report.

21. A computer system for evaluating a coded file, comprising:
a library of supported codes for a plurality of applications, wherein the library of supported codes comprises a plurality of code data structures including a code data structure for each of the plurality of applications; and
a file evaluator, wherein the file evaluator compares codes in the coded file to the library of supported codes and identifies at least one unsupported code, wherein the at least one unsupported code is not supported by at least one application in the plurality of applications;
wherein the file evaluator generating a common code data structure based on the plurality of code data structures and identifies at least one common code for the at least one unsupported code based on the common code data structure.

22. A computer program product, in a computer readable medium, for evaluating a script, comprising:
instructions for receiving a library of supported functions for a plurality of applications, wherein the library of supported functions comprises a plurality of function data structures including a function data structure for each of the plurality of applications;
instructions for comparing script functions in the script to the library of supported functions; and
instructions for identifying at least one unsupported script function, wherein the at least one unsupported script function is not supported by at least one application in the plurality of applications;
instructions for generating a common function data structure based on the plurality of function data structures; and
instructions for identifying at least one common function for the at least one unsupported script function based on the common function data structure.

23. A computer program product in a computer readable medium, for evaluating a coded file, comprising:
instructions for receiving a library of supported codes for a plurality of applications, wherein the library of supported codes comprises a plurality of code data structures including a code data structure for each of the plurality of applications;
instructions for comparing codes in the coded file to the library of supported codes; and
instruction for identifying at least one unsupported code, wherein the at least one unsupported code is not supported by at least one application in the plurality of applications;
generating a common code data structure based on the plurality of code data structures; and
identifying at least one common code for the at least one unsupported code based on the common code data structure.

* * * * *